United States Patent [19]
Rao et al.

[11] Patent Number: 5,354,547
[45] Date of Patent: Oct. 11, 1994

[54] HYDROGEN RECOVERY BY ADSORBENT MEMBRANES

[75] Inventors: Madhukar B. Rao, Allentown; Shivaji Sircar, Wescosville; Joseph M. Abrardo, Schnecksville; William F. Baade, Breinigsville, all of Pa.

[73] Assignee: Air Products and Chemicals, Inc., Allentown, Pa.

[21] Appl. No.: 923,768

[22] Filed: Aug. 3, 1992

Related U.S. Application Data

[63] Continuation-in-part of Ser. No. 436,566, Nov. 14, 1989, abandoned.

[51] Int. Cl.$^5$ .............................................. B01D 59/10
[52] U.S. Cl. ...................................... 423/650; 95/41; 95/45; 95/50; 423/652
[58] Field of Search ............... 423/652, 650; 55/16; 95/41, 45, 50

[56] References Cited

U.S. PATENT DOCUMENTS

| | | | |
|---|---|---|---|
| 4,398,926 | 8/1983 | Doshi | 55/16 |
| 4,690,695 | 9/1987 | Doshi | 55/16 |
| 4,701,187 | 10/1987 | Choe et al. | 55/16 |
| 4,981,676 | 1/1991 | Minet et al. | 423/652 |
| 5,104,425 | 4/1992 | Rao et al. | 55/16 |
| 5,131,930 | 7/1992 | Vines | 55/16 |

FOREIGN PATENT DOCUMENTS

| | | |
|---|---|---|
| 3315930 | 3/1984 | Fed. Rep. of Germany. |
| 58-120502 | 7/1983 | Japan. |
| 62-153389 | 7/1987 | Japan. |
| 62-153390 | 7/1987 | Japan. |

*Primary Examiner*—Wayne Langel
*Attorney, Agent, or Firm*—John M. Fernbacher; James C. Simmons; William F. Marsh

[57] ABSTRACT

A composite semipermeable membrane comprising microporous adsorbent material supported by a porous substrate is operated in series with a pressure swing adsorption (PSA) system and the PSA reject gas is used as a sweep gas to improve membrane performance. The integrated membrane-PSA system is particularly useful for recovering high-purity hydrogen from a mixture of hydrogen and hydrocarbons, and is well-suited for integration with a steam-methane reformer.

14 Claims, 2 Drawing Sheets

HYDROGEN RECOVERY BY ADSORBENT MEMBRANES

This application is a continuation-in-part of U.S. Ser. No. 436,556 filed Nov. 14, 1989, abandoned.

FIELD OF THE INVENTION

This invention pertains to the recovery of hydrogen from hydrogen-hydrocarbon mixtures, and in particular the recovery of hydrogen from such mixtures utilizing an adsorbent membrane integrated with a pressure swing adsorption process.

BACKGROUND OF THE INVENTION

The recovery of hydrogen from hydrogen-hydrocarbon mixtures is an important gas separation in the petroleum refining and related industries. High purity hydrogen is recovered from refinery waste streams containing hydrogen and hydrocarbons with up to four or five carbon atoms, or alternately from synthesis gas generated from natural gas by steam-methane reforming or by partial oxidation of heavier hydrocarbons. Economical recovery of hydrogen from such streams at high purity and recovery often requires a combination of cryogenic distillation or absorption and pressure swing adsorption (PSA), or a combination of diffusion through a polymeric membrane and pressure swing adsorption (PSA). In the latter process combination, a hydrogen-rich permeate is withdrawn from the membrane unit at a lower pressure, is compressed to a higher pressure, and is purified by the PSA system to yield a hydrogen product up to 99.999 vol % purity at a pressure slightly below the higher pressure. Hydrocarbon-rich waste streams from the membrane and PSA units often are used as fuel. U.S. Pat. Nos. 4,398,926, 4,690,695, and 4,701,187 describe various integrations of polymeric membranes and PSA systems for the recovery of hydrogen from various gas mixtures.

Prior art membrane-PSA systems for hydrogen recovery are characterized by a large pressure differential across the membrane as hydrogen selectively diffuses, which requires initial compression to provide a high pressure polymeric membrane feed (typically greater than 200 psig) and recompression of the hydrogen-rich permeate as feed to the PSA system for final purification. These compression steps comprise a significant portion of the capital and operating cost of a polymeric membrane-PSA system for hydrogen recovery.

U.S. Pat. No. 5,104,425 discloses a composite semipermeable membrane comprising microporous adsorptive material supported by a porous substrate, and teaches the use of this membrane for separation of gas mixtures including hydrogen-hydrocarbon mixtures. This membrane differs from conventional polymeric membranes in that the hydrocarbon impurities preferentially diffuse through the membrane and the hydrogen-rich product is withdrawn as a nonpermeate stream at a pressure slightly below the feed pressure.

Improved methods for hydrogen recovery will be needed as the expected demand for hydrogen increases in the petroleum refining, transportation, and related industries. In particular, it is desirable to reduce compression cost and membrane module size when using integrated membrane-PSA systems for hydrogen recovery. The present invention, which utilizes an adsorbent membrane separator integrated with additional gas generation and separation steps as disclosed and defined in the following specification and claims, addresses this need for more efficient methods for the recovery and purification of hydrogen.

SUMMARY OF THE INVENTION

The present invention is a method for the recovery of one or more primary components from a gaseous feed mixture comprising these primary components and one or more secondary components, wherein the secondary components are more strongly adsorbed on an adsorbent material than the primary components. The method comprises passing the feed mixture into a separator containing a composite semipermeable membrane comprising microporous adsorbent material supported by a porous substrate and withdrawing from tile separator a nonpermeate intermediate product stream enriched in the primary components. The membrane has a feed side and a permeate side, and portions of the secondary components are selectively adsorbed by the microporous adsorbent material and diffuse from the feed side to the permeate side as an adsorbed fluid phase. A permeate comprising the secondary components is withdrawn from the permeate side of the membrane. The nonpermeate intermediate product stream is separated into a high-purity product stream comprising the primary components and a reject stream comprising additional portions of the secondary components. At least a portion of this reject stream is passed across the permeate side of the membrane as a sweep gas and a sweep gas/permeate effluent stream is withdrawn from the separator. The use of the reject stream, which is relatively lean in the primary components and contains a significant amount of the secondary components, as a membrane sweep gas increases the recovery of primary components and increases the permeation rate of the secondary components through the membrane. Preferably, the intermediate product stream is separated by passing the stream into a pressure swing adsorption (PSA) system in which the remaining secondary components are selectively adsorbed, and withdrawing from the PSA system a high purity product comprising the primary components and a reject stream comprising additional portions of the secondary components.

In a preferred embodiment of the invention, the feed mixture contains hydrogen as the primary component and one or more hydrocarbons as the secondary components in the gas mixture. The hydrocarbons are selected From methane, ethane, ethylene, propane, propylene, butane, isobutane, butylene, isobutylene, and mixtures thereof. In a related alternate embodiment, a methane-containing feed stream is reformed in a steam-methane reformer to produce a synthesis gas comprising hydrogen, carbon oxides, water, and unreacted methane, and the synthesis gas is combined with the intermediate hydrogen product stream from the adsorbent membrane system prior to separation in the PSA system. In an additional embodiment, at least a portion of the sweep gas/permeate effluent stream is fed to a dephlegmator, which separates this stream into a hydrocarbon product stream containing $C_3$ and heavier hydrocarbons and an intermediate light hydrocarbon stream containing components lighter than $C_3$. The intermediate light hydrocarbon stream is combined with the intermediate product stream From the membrane prior to separation in the PSA system.

In an alternate embodiment, the invention is a method for the production of hydrogen from a methane-containing feed gas and a gas mixture containing hydrogen and hydrocarbons. The method comprises passing the gas mixture containing hydrogen into a separator containing a composite semi permeable membrane comprising microporous adsorbent material supported by a porous substrate and withdrawing from the separator an intermediate product stream enriched in hydrogen. The membrane has a feed side and a permeate side, and portions of the secondary components are selectively adsorbed by the microporous adsorbent material and diffuse from the feed side to the permeate side of the membrane as an adsorbed fluid phase. A permeate stream comprising these portions of hydrocarbons is withdrawn from the permeate side of the membrane. A portion of the methane-containing feed gas is reformed in a steam-methane reformer to produce a synthesis gas comprising hydrogen, carbon oxides, water, and unreacted methane, and this synthesis gas is combined with the intermediate product stream. The resulting combined stream is fed to a PSA system wherein hydrocarbons and carbon oxides are selectively adsorbed; a high-purity hydrogen product and a reject stream comprising hydrocarbons and carbon oxides are withdrawn from the PSA system. The remaining portion of the methane-containing feed gas is passed across the permeate side of the membrane as a sweep gas to yield a sweep gas/permeate effluent stream, thereby increasing the recovery of hydrogen and increasing the permeation rate of hydrocarbons through said membrane. The sweep gas/permeate effluent stream can be used as feed or fuel in the steam-methane reformer.

The invention includes an integrated separation system for accomplishing the separation described above. The system comprises one or more separator modules each containing the composite semipermeable membrane comprising microporous adsorbent material supported by a porous substrate, each membrane having a feed side and a permeate side, wherein the adsorbent material is capable of selective adsorption and permeation of the secondary components. The integrated separation system also includes a pressure swing adsorption system having a plurality of adsorbent vessels containing granular adsorbent material capable of selectively adsorbing said secondary components, and further includes means for the following functions: (1) introducing the gaseous feed mixture into each of the separator modules on the feed side of the membrane; (2) removing a nonpermeate intermediate product stream from the feed side of the membrane from each of the separator modules; (3) introducing the intermediate product stream into the pressure swing adsorption system; (4) removing a high purity product stream comprising the primary components and a reject stream comprising the secondary components from the pressure swing adsorption system; (5) introducing at least a portion of the reject stream into each of the separator modules and passing the portions of the reject stream over the permeate side of each membrane as a sweep gas; and (6) withdrawing from the separator modules a mixed sweep gas/permeate stream.

The present invention is especially useful for the recovery of hydrogen at high purity from refinery waste gases comprising hydrogen and hydrocarbons. The combination of the adsorbent membrane and PSA systems for this separation is different and unique compared with the prior art combination of polymeric membrane and PSA systems, chiefly because the method of the present invention recovers hydrocarbon components at low pressure as membrane permeate and PSA reject while recovering hydrogen product at relatively high pressures. The adsorbent membrane system can be operated at a lower pressure than a polymeric membrane system thus requiring less feed compression; in addition, the hydrogen compression required between the membrane and PSA systems is lower for the present invention because the hydrogen-rich stream from the membrane is produced at near feed pressure.

DETAILED DESCRIPTION OF THE INVENTION

The method of the present invention is useful for the recovery of lighter, less strongly adsorbed components in a gas mixture from heavier, more strongly adsorbed components in the mixture. In the preferred embodiment, the light component is hydrogen and the heavier components are hydrocarbons typically including one or more of the saturated and unsaturated $C_1$-$C_4$ hydrocarbons, although heavier hydrocarbons, carbon oxides, and other components also may be present in the feed mixture. High-purity hydrogen can be recovered using this method from gas mixtures containing from 10 to 60 vol % hydrogen. Alternatively, the method is useful for the recovery of helium from mixtures also containing $C_1$-$C_3$ hydrocarbons and carbon oxides.

The separation method of the present invention utilizes two different adsorption-based separation steps in series in a unique process combination of continuous diffusion through an adsorbent membrane followed by cyclic pressure swing adsorption (PSA). For the purposes of the present specification and claims, the term "primary components" refers to the component or components which permeate only slightly through the membrane or adsorb only slightly in the PSA adsorbers and which generally are recovered as the final product. The term ∂secondary components" refers to the components which selectively and preferentially permeate through the adsorbent membrane and are selectively and preferentially adsorbed in the PSA adsorbers. In the preferred embodiment, a feed gas mixture containing hydrogen as the primary component and one or more hydrocarbons as the secondary components is passed over a composite semipermeable membrane which comprises a microporous adsorbent material supported by an essentially inert substrate. This membrane is generically described in the present specification as an adsorbent membrane, and is installed in a separator vessel or module as described below. The hydrocarbons are selectively adsorbed and diffuse through the membrane in an adsorbed phase to yield a permeate enriched in these components. The lessstrongly-adsorbed hydrogen is withdrawn from the membrane as a hydrogen-rich nonpermeate stream which is further purified in a pressure swing adsorption (PSA) system to yield a high-purity hydrogen product defined as at least 99.9+ vol % hydrogen and a PSA reject stream containing essentially all of the hydrocarbons in the PSA feed along with some hydrogen. It has been found unexpectedly in the present invention that passing the methane-containing PSA reject stream as a sweep stream across the permeate side of the membrane increases the hydrogen recovery and the hydrocarbon permeation rates compared with the use of high purity hydrogen product from the PSA system as a sweep gas. It has been found unexpectedly that the hydrogen flux through the membrane can be reduced by using a methane-containing sweep even though the partial pressure driving force for hydrogen may be increased using this sweep gas. In the present invention, the PSA reject gas is preferred over the hydrogen product as the sweep gas. This results in higher hydrogen recovery and a more energy efficient separation.

Alternatively, other streams containing one or more of the same secondary components present in the membrane feed gas may be used as a sweep gas across the second membrane surface when no further separation of the membrane nonpermeate stream is desired, or when the reject stream from a PSA system treating membrane reject gas is used for another purpose. In the separation of hydrogen-hydrocarbon mixtures, for example, such other streams would include natural gas or certain hydrogen-hydrocarbon gas mixtures available in a petroleum refinery. Thus an alternate embodiment of the invention comprises the separation of a gas mixture containing primary and secondary components by a composite adsorptive membrane as described herein, in which the membrane is operated with a sweep gas containing one or more of the same secondary components obtained from a source separate from the membrane feed. The general criterion for selecting a sweep gas other than PSA reject is the absence of the heavier hydrocarbons in any significant amounts.

The adsorbent membrane utilized in the present invention comprises a microporous adsorbent material supported by an essentially inert substrate, wherein the substrate does not significantly affect the separation of the gaseous components. The microporous adsorbent material is preferably activated carbon, but others such as zeolite, activated alumina, and silica gel may be deposited or formed on an appropriate substrate. An activated carbon composite membrane for use in the present invention and methods for making the membrane are disclosed in U.S. Pat. No. 5,104,425, the specification of which is incorporated herein by reference. One type of membrane for use in the present invention is made by coating a porous graphite substrate with a thin film of an aqueous suspension (latex) containing a polyvinylidine chloride-acrylate terpolymer, drying the coated substrate at 150° C. for five minutes, heating the substrate in nitrogen to 1000° C. at a rate of 1° C. per minute, holding at temperature for three hours, and cooling to ambient temperature at 10° C. per minute. The polymer coating is carbonized during the heating step thereby forming an ultrathin layer of microporous carbon on the substrate.

The adsorbent membrane and substrate can be fabricated in a tubular configuration in which the microporous adsorbent material is deposited on the inner and/or outer surface of a tubular porous substrate, and the resulting tubular adsorbent membrane elements can be assembled in a shell-and-tube configuration in an appropriate pressure vessel to form a membrane module. A plurality of membrane modules in parallel and/or series can be utilized when gas feed rates and separation requirements exceed the capability of a single module of practical size. Alternatively, the adsorbent membrane and support can be fabricated in a flat sheet configuration which can be assembled into a module using a plate-and-frame arrangement. Alternatively, the adsorbent membrane and support can be fabricated in a monolith configuration to provide a high membrane surface area per unit volume of membrane module. The monolith can be a porous ceramic, porous glass, porous metal, or a porous carbon material. It is also possible to use a hollow fiber configuration in which the adsorbent membrane is supported by fine hollow fibers of the substrate material.

Pressure swing adsorption (PSA) systems for the separation of gas mixtures are well known in the art, and are widely used for example in the recovery and purification of hydrogen in the petroleum refining industry. One representative type of PSA system is disclosed in U.S. Pat. No. 4,077,779, the specification of which is incorporated herein by reference. In a typical PSA system for the recovery of hydrogen, a mixture of hydrogen and hydrocarbons is passed through one of a plurality of adsorber vessels containing one or more adsorbents such as activated carbon or zeolite, wherein the hydrocarbons are selectively adsorbed by the adsorbent, and a high purity hydrogen product is withdrawn from the adsorber. After a predetermined time period, the vessel is isolated and feed gas flows to another adsorber vessel. The isolated vessel is depressurized to desorb adsorbed hydrocarbons, which are withdrawn from the adsorber as a reject or waste stream. A purge step with product hydrogen sweeps residual hydrocarbons from the adsorber for recycle to feed, or an external purge gas may be employed and the purge gas utilized externally. Various pressure equalization steps between adsorbers may be employed to improve product recovery and reduce power consumption in the process.

Figure 1:
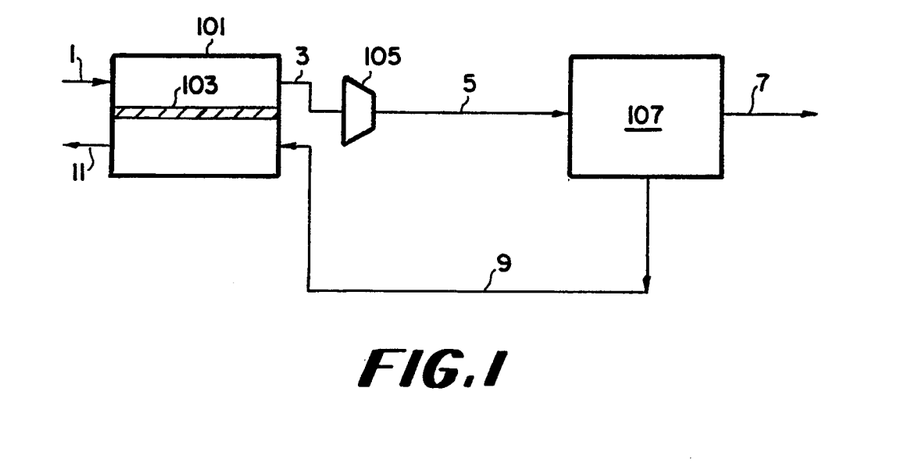
FIG. 1 is a schematic flowsheet of the present invention in which an adsorbent membrane is integrated with a pressure swing adsorption system.

The basic embodiment of the present invention is illustrated in FIG. 1. Feed stream 1 containing one or more primary components and one or more secondary components flows to adsorptive membrane module 101, which contains composite semipermeable membrane 103 which comprises an adsorbent material supported by a porous substrate as earlier described. For the purposes of this illustration, the primary component is hydrogen and the secondary components are $C_1$–$C_4$ hydrocarbons, although other gas mixtures can be separated by the process as earlier described. These $C_1$–$C_4$ hydrocarbons preferentially adsorb and permeate through membrane 103 and hydrogen-enriched nonpermeate stream, containing a residual concentration of hydrocarbons, flows from membrane module 101. Feed stream 101 is supplied at a pressure preferably between 20 and 300 psig, and nonpermeate stream 3 is withdrawn at a slightly lower pressure due to the pressure drop across the module of typically 2 to 5 psi. Membrane nonpermeate stream 3 is compressed if necessary in compressor 105 to between 200 and 400 psig, and compressed stream 5 flows into PSA system 107 in which essentially all of the residual hydrocarbons are selectively adsorbed. High purity hydrogen product stream 7 containing up to 99.999 vol % hydrogen is withdrawn therefrom. PSA reject stream 9 is withdrawn at a pressure typically between 2 and 50 psig and passed through the permeate side of membrane module 101 to sweep membrane 103. Combined sweep gas/permeate effluent stream 11, containing essentially all hydrocarbon impurities in feed stream 1, is withdrawn from membrane module 101 at between 1 and 45 psig. It has been unexpectedly found that sweeping the permeate side of the membrane with the methane-containing PSA reject improves hydrogen recovery and increases the hydrocarbon permeation rate through the membrane compared with the use of hydrogen as the sweep gas, and is thus preferred over hydrogen as a sweep gas. Membrane module 101 and PSA system 107 typically operate in a near-ambient temperature range between 60° and 100° F., although it may be desirable to operate at the membrane module at subambient temperature.

The present invention as illustrated by FIG. 1 is characterized by the unique feature that the hydrocarbon impurities are recovered from feed stream 1 in membrane module 101 and PSA system 107 at low pressure, while hydrogen product stream 7 and membrane nonpermeate product stream 3 are recovered from the respective process steps at much higher pressures. Typically module 101 can be operated at a somewhat lower pressure than PSA system 107 because of the high hydrocarbon permeability of adsorbent membranes. This unique feature is in direct contrast with a typical prior art membrane-PSA combination system which utilizes a polymeric membrane because the hydrogen selectively permeates through the polymeric membrane and is withdrawn from the membrane module on the low pressure side. This requires significant recompression of the hydrogen-rich polymeric membrane permeate stream prior to feeding to the PSA system when compared to the present invention. In addition, feed compression is required for polymeric membranes because of their low absolute permeabilities but is usually not required for adsorbent membranes which have high permeabilities. The method of the present invention as illustrated in FIG. 1 therefore allows recovery of hydrogen product stream 7 with a much lower power consumption than a corresponding membrane-PSA combination system which uses a polymeric membrane. Module 101 and PSA system 107 can be operated at similar pressures if desired, which would eliminate the need for compressor 105.

Figure 2:
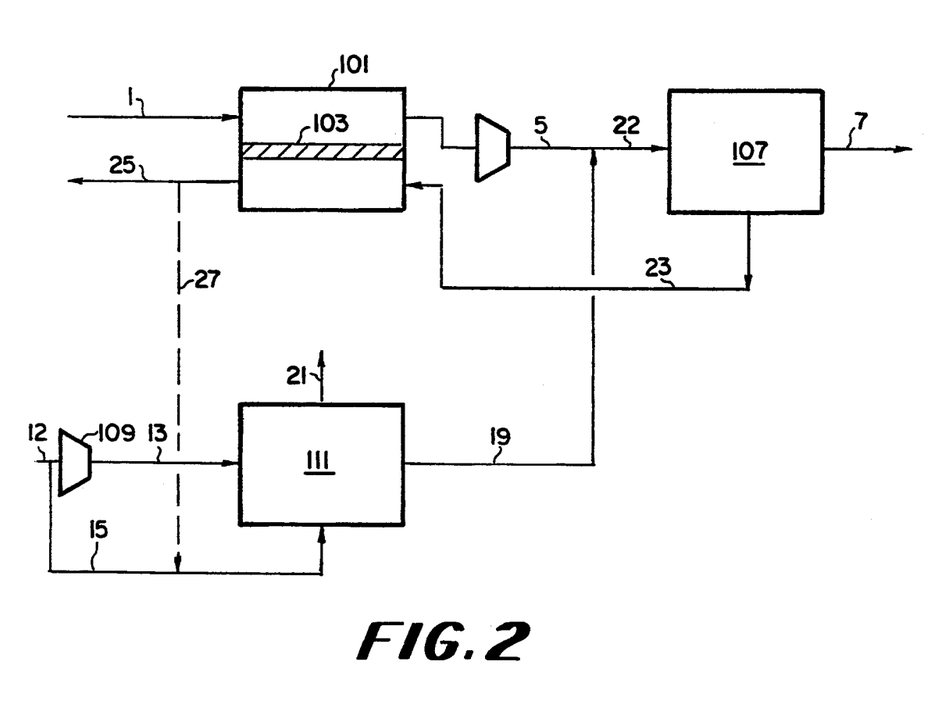
FIG. 2 is a schematic flowsheet of a second embodiment of the present invention in which an adsorbent membrane is integrated with a pressure swing adsorption system and a hydrocarbon reforming system.

The process configuration of FIG. 1 can be integrated with other process steps for use in petroleum refinery applications as illustrated in the alternate embodiment of the present invention shown in FIG. 2. In this embodiment, a steam-methane reformer for the production of hydrogen is integrated with the embodiment of FIG. 1. A portion of methane-containing feed stream 12, typically natural gas or a refinery offgas stream, is compressed if necessary to between 200 and 1000 psig by compressor 109 to yield reformer feed stream 13. A portion of methane-containing feedstream 12 is utilized as reformer fuel stream 15. In reformer system 111, utilizing methods well-known in the art, feed stream 13 is combined with steam (not shown) and reacted catalytically at an elevated temperature to form a raw synthesis gas comprising hydrogen, carbon monoxide, carbon dioxide, water, and unreacted methane. Carbon monoxide is shifted (not shown) to form additional hydrogen and carbon dioxide, yielding raw hydrogen product stream 19. The required elevated temperature is provided by combustion of reformer fuel stream 15 in a reformer furnace (not shown) which yields flue gas 21. Raw hydrogen product stream 19, typically containing 15–20 vol % carbon dioxide, 0–4 vol % carbon monoxide, 0–5 vol % water, and 0–4 vol % methane, is purified in PSA system 107 to yield high purity hydrogen product 7 for use in hydrotreating and other applications.

Feed stream 1 in this embodiment is a refinery waste stream typically containing 5–60 vol % hydrogen and the remainder hydrocarbons. Such streams are typically used as fuel rather than for hydrogen recovery. Membrane module 101 is operated as described earlier. In the present embodiment, compressed membrane nonpermeate product stream 5 is combined with raw hydrogen product stream 19, and combined stream 22 is passed to PSA system 107. In the PSA system, residual hydrocarbons, carbon monoxide, carbon dioxide, and water are removed by selective adsorption to yield high purity hydrogen product stream 7. Methane-containing PSA reject stream 23, which differs in composition from PSA reject stream 9 of FIG. 1, is utilized as a sweep gas in membrane module 101; combined sweep gas/permeate effluent stream 25, containing essentially all hydrocarbon impurities in feed stream 1 and impurities in raw hydrogen product stream 19, is withdrawn from membrane module 101 at between 2 and 50 psig. The use of methane-containing sweep gas improves hydrogen recovery and increases permeation rates through membrane 103. Optionally, a portion 27 of combined sweep gas/permeate effluent stream 25 is used as fuel in reformer system 111.

This particular embodiment is useful as a retrofit to an existing refinery reformer system 111 and PSA system 107 by installing membrane module 101 to recover additional hydrogen from waste stream 1. The operating capacity of PSA system 107 would be expanded to accommodate additional stream 5, and thus a larger volume of hydrogen product 7 would be available. This retrofit would eliminate the need for installation of another reformer system otherwise required to increase hydrogen production capacity.

Figure 3:
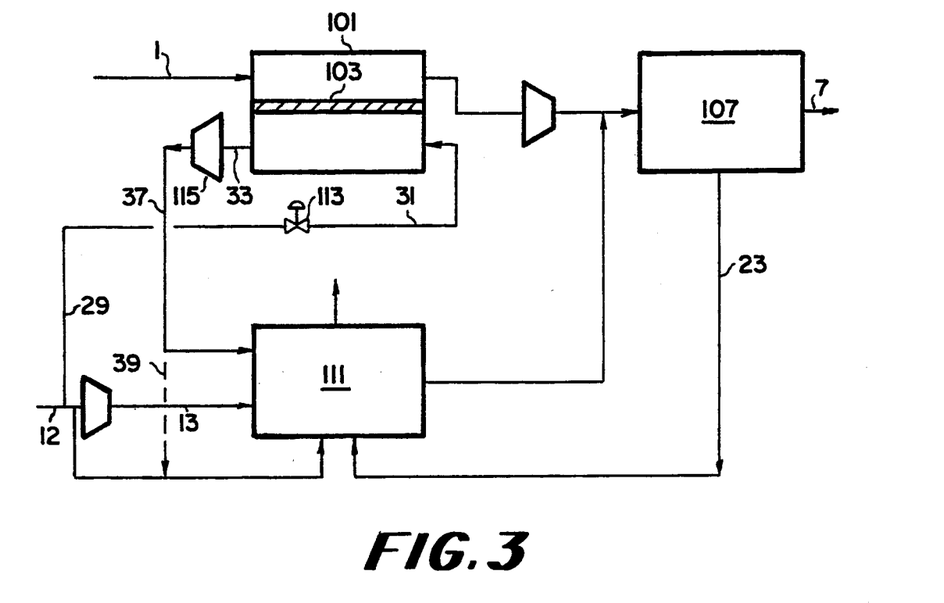
FIG. 3 is a schematic flowsheet of a third embodiment of the present invention in which an adsorbent membrane is integrated with a pressure swing adsorption system and a hydrocarbon reforming system.

An alternate but related embodiment is illustrated in FIG. 3 in which an adsorptive membrane module, a PSA system, and a steam-methane reformer are integrated in a manner different from that of FIG. 2. In the present embodiment of FIG. 3, methane-containing PSA reject stream 23 is utilized as fuel in reformer system 111, a portion 29 of reformer feed stream 12 is optionally reduced in pressure across valve 113, and stream 31 is utilized for sweep of the permeate side of membrane 103 in module 101. Combined sweep gas/permeate effluent stream 33, containing essentially all hydrocarbon impurities in feed stream 1, is withdrawn from membrane module 101 at between 2 and 50 psig and is compressed to 200–500 psig in compressor 115. It has been unexpectedly found that sweep with methane improves hydrogen recovery and increases the hydrocarbon permeation rate through the membrane, and is preferred over hydrogen as a sweep gas. Compressed sweep gas/permeate effluent stream 37 or a portion thereof is utilized as additional feed for reformer system 111. Alternatively, portion 39 of stream 37 can be utilized in reformer system 111 as fuel.

Figure 4:
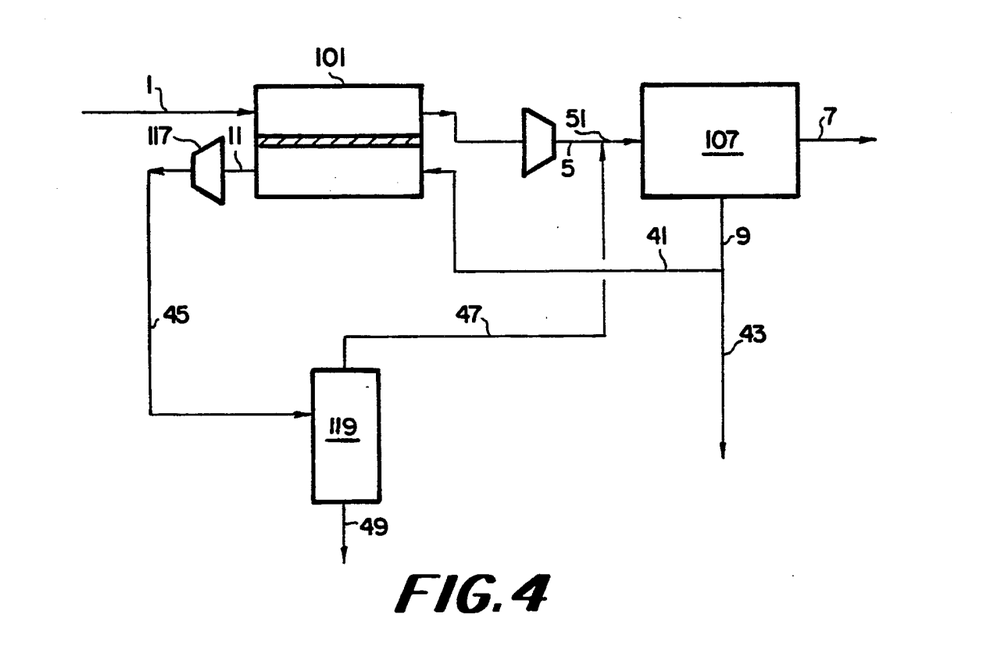
FIG. 4 is a schematic flowsheet of a fourth embodiment of the present invention in which an adsorbent membrane is integrated with a pressure swing adsorption system and a dephlegmator.

An alternate embodiment is illustrated in FIG. 4 in which membrane module 101 and PSA system 107 are operated in a manner similar to the embodiment of FIG. 1. In this alternate embodiment, a portion 41 methane-containing PSA reject stream 9 is utilized as a sweep gas for membrane module 101 to yield sweep gas/permeate stream 11. The remaining portion 43 of PSA reject stream 9 is removed as purge and is typically used as fuel. Stream 11 is compressed to 100–300 psig in compressor 117 and compressed hydrocarbon-rich stream 45 is fed to dephlegmator 119, which separates stream 45 into stream 47 containing hydrocarbons lighter than $C_3$, and product stream 49 containing $C_3$ and heavier hydrocarbons. The use of a dephlegmator. For separating hydrocarbons is known in the art, and is disclosed for example in U.S. Pat. No. 4,002,042 the specification of which is incorporated herein by reference. A dephlegmator is essentially a vertical heat exchanger having passages in which an upward-flowing feedstream is cooled by indirect refrigeration, thereby condensing some of the heavier mixture components which flow downward on the walls of the passages forming a reflux liquid. The liquid flows from the bottom of the dephlegmator as the heavier product stream; the uncondensed components are withdrawn overhead as the light product.

Stream 49 is essentially liquified petroleum gas (LPG) which is a widely marketable fuel; alternatively stream 49 can be separated further into valuable petrochemical feedstocks. Stream 47 is combined with compressed membrane nonpermeate gas 5 and the combined stream 51 provides feed to PSA system 107; this further processing of stream 47 maximizes the recovery of hydrogen product 7 and LPG product 49. Using the membrane to recover hydrocarbons from feed stream 1 increases the partial pressure of hydrocarbons to the dephlegmator, which allows operation of the dephlegmator at a higher temperature, which in turn requires less refrigeration duty. Also, rise of the membrane decreases flow to the dephlegmator which reduces the size of the dephlegmator and compressor 117. Thus this embodiment is a new and useful integration of an adsorptive membrane module, a PSA system, and a dephlegmator for recovering high purity hydrogen and LPG from a refinery waste stream which otherwise would be used directly as a relatively low-value fuel.

EXAMPLE 1

Membranes were made by coating porous (0.7 micron pore diameter) graphite substrate discs 4.5 inches in diameter with a thin film of an aqueous suspension (latex) containing a polyvinylidine chloride-acrylate terpolymer, drying the coated discs at 150° C. for five minutes, heating the discs in nitrogen to 1000° C. at a rate of 1° C. per minute, holding at temperature for three hours, and cooling to ambient temperature at 10° C. per minute. The polymer coating is carbonized during the heating step thereby forming an ultrathin layer of microporous carbon on the substrate discs. A laboratory plate-and-frame membrane module was constructed using five of these discs having a total membrane area of 0.385 sq ft. A feed gas containing 40 vol % hydrogen, 20 vol % methane, 10 vol % ethane, and 10 vol % propane at 262° K. and 50 psig was passed through the feed side of the membrane at a flow rate of $6.74 \times 10^{-5}$ gmol/sec. Hydrogen with a purity of 99.995 vol % was passed at the same temperature and 1 psig as a sweep gas through the permeate side of the membrane at three different flow rates corresponding to sweep:feed ratios of 0.053, 0.079, and 0.155. Composition and flow rates were determined for the membrane nonpermeate stream and the combined permeate/sweep effluent stream; hydrocarbon rejection and hydrogen recovery were calculated by material balance for each sweep:feed ratio. Hydrocarbon rejection is defined for each component as the percentage of each individual hydrocarbon in the membrane module feed which is withdrawn from the membrane module in the combined permeate/sweep effluent stream. The hydrogen recovery is defined as the difference between the hydrogen flow rate in the high pressure membrane product (i.e. stream 3 in FIG. 1) and the hydrogen sweep flow rate, divided by the flow rate of hydrogen in the membrane feed (i.e. stream 1 in FIG. 1. The procedures were repeated using methane (99.7 vol % purity) as the sweep gas. The results are summarized in Table 1 and clearly show that the use of methane as a sweep gas yields higher hydrogen recovery and higher hydrocarbon rejection than the use of hydrogen as a sweep gas.

TABLE 1

| | EFFECT OF SWEEP GAS COMPOSITION ON MEMBRANE PERFORMANCE | | | | | |
|---|---|---|---|---|---|---|
| | S/F = 0.053 | | S/F = 0.097 | | S/F = 0.155 | |
| | $H_2$ SWEEP | $CH_4$ SWEEP | $H_2$ SWEEP | $CH_4$ SWEEP | $H_2$ SWEEP | $CH_4$ SWEEP |
| Hydrogen Recovery in Module, % | 68.9 | 71.0 | 57.0 | 70.0 | 47.8 | 70.0 |
| Hydrogen Product Purity, Mol % | 50.0 | 51.5 | 50.9 | 52.4 | 52.3 | 53.2 |
| Hydrocarbon Rejection, % | | | | | | |
| Butane | 86.6 | 95.4 | 92.2 | 97.6 | 98.3 | 100.0 |
| Propane | 60.6 | 69.8 | 66.0 | 76.3 | 75.2 | 82.4 |
| Ethane | 34.5 | 46.8 | 37.6 | 51.9 | 23.0 | 56.4 |
| Methane | 20.7 | 29.0 | 8.3 | 29.0 | 23.0 | 27.7 |

EXAMPLE 2

The data of Example 1 were used to calculate the expected performance of the membrane module operating in series with a pressure swing adsorption (PSA) system in which the membrane nonpermeate stream provides feed to the PSA system as shown in FIG. 1. The performance of the PSA system with this feed gas was calculated using the standard design methods described by L. Lancelin et al in an article entitled "Hydrogen Purification by Pressure Swing Adsorption" from the Hydrogen Symposium of the French Association of Petrochemical Engineers, Feb. 26, 1976. At a PSA feed concentration of about 51 vol % hydrogen (which is a typical membrane product purity as shown in Table 1) the PSA system operates at a hydrogen recovery of 60%. The overall hydrogen recovery from the combined membrane-PSA system was calculated by material balance for two cases: (1) membrane sweep provided by part of the PSA hydrogen product and (2) membrane sweep provided by methane-containing PSA reject gas. The effects of sweep gas on membrane performance were based on the data of Example 1. The results of the calculations for three different sweep-to-feed ratios are given in Table 2 and illustrate that the use of PSA reject as the sweep gas allows significantly higher hydrogen recovery than the use of product hydrogen as the sweep gas.

TABLE 2

Overall % Hydrogen Recovery for Membrane-PSA System

| Sweep/Feed Ratio | % Hydrogen Recovery | |
|---|---|---|
| | Hydrogen Sweep | PSA Reject Sweep |
| 0.053 | 37.3 | 42.6 |
| 0.097 | 23.9 | 42.0 |
| 0.155 | 13.8 | 42.0 |

These results in combination with Example 1 illustrate that the PSA reject stream is the preferred sweep gas because (1) the methane-containing sweep gas increases the rejection of hydrocarbons and increases the recovery of hydrogen in the membrane module, and (2) increases the overall hydrogen recovery of the combined membrane-PSA system.

EXAMPLE 3

The membrane module of Example 1 was used to separate a gas stream with a composition of 20 vol % hydrogen, 20 vol % methane, 16 vol % ethane+ethylene, and 44 vol % propane+propylene, which is a typical composition of a certain type of petroleum refinery waste gas stream. This gas was fed to the membrane module at 100 psig, 80° F., and a flow rate of $3.3 \times 10^{-4}$ gmol/sec; the permeate side of the membrane was purged with a methane-rich sweep gas at 1 psig and 80° F. with a sweep:feed ratio of 0.2. This sweep gas contained 29.6 vol % hydrogen, 10.3 vol % ethane, and 60.1 vol % methane, which is the approximate composition of the PSA reject stream 9 of FIG. 1. 56% of the hydrogen in the feed was recovered in the membrane nonpermeate at 95 psig and 80° F. at a flow rate 0.3 times the feed rate. The sweep/permeate effluent was withdrawn at 1 psig, 80° F., and a flow rate of 0.9 times that of the feed rate. Hydrocarbon recoveries in this stream were 45.44 for methane, 75.0% for ethane+ethylene, and 98.0% for propane plus propylene. Thus the bulk of the heavier hydrocarbons permeated across the membrane while a high hydrogen recovery was achieved.

EXAMPLE 4

The experimental data of Example 3 were used to calculate the expected performance of the membrane module operating in series with a pressure swing adsorption (PSA) system in which the adsorbent membrane nonpermeate stream provides feed to the PSA system and the methane-containing PSA reject stream provides sweep gas to the membrane module. The feed stream of Example 3 cannot be separated using a PSA system alone because hydrogen recovery would be uneconomically low. The use of a polymeric membrane ahead of the PSA system would require a high feed pressure because of the low hydrogen concentration in the feed gas.

The performance of the PSA system operating on the adsorbent membrane nonpermeate stream was calculated using the standard design methods described by L. Lancelin et al in an article entitled "Hydrogen Purification by Pressure Swing Adsorption" from the Hydrogen Symposium of the French Association of Petrochemical Engineers, Feb. 26, 1976. The energy consumption for this membrane-PSA system at a hydrogen production rate of one mill ion standard cubic feet per day were calculated and compared with known information for the production of hydrogen by the conventional route of steam-methane reforming (SMR) with product recovery by PSA. The calculations were based on a hydrogen product purity of 99.999 vol % at a pressure of 200 psig. Net energy consumption for operating the membrane-PSA system was calculated as the energy (fuel) content of the waste gas feed minus the energy (fuel) content of the combined sweep/permeate stream plus the compression energy for operation of the membrane-PSA system. The net energy consumption for the SMR-PSA system was calculated as the energy (fuel) content of the methane feed plus the compression energy for operation of the SMR-PSA system minus the energy content of export steam from the SMR; the PSA reject stream was used as Fuel in the SMR as commonly practiced. Capital costs were calculated for the membrane-PSA system and the SMR-PSA system using known commercial SMR and PSA costs and engineering estimates of the adsorbent membrane module cost. Table 3 summarizes the results of the calculations in terms of relative capital cost, hydrogen product cost, and energy consumption for the two production methods. The results indicate that recovery of hydrogen from waste gas containing hydrogen and hydrocarbons using the membrane-PSA system of the present invention is less energy-intensive and more cost-effective than the production of hydrogen from methane via steam-methane reforming when compared on the basis of standalone membrane-PSA and SMR-PSA systems.

TABLE 3

Relative Costs for Standalone Membrane-PSA and SMR-PSA Systems

| | Capital Cost | Energy Cost | Net Hydrogen Cost |
|---|---|---|---|
| Membrane + PSA | 0.60 | 0.92 | 0.69 |
| SMR + PSA | 1.00 | 1.00 | 1.00 |

In addition, a material balance was prepared for the key streams in the membrane-PSA system in accordance with the stream number designations of FIG. 1, and a summary of stream flow rates, compositions, and pressures are given in Table 4.

TABLE 4

STREAM FLOW RATES AND COMPOSITIONS FOR EXAMPLE 4 (STREAM NUMBERS FROM FIG. 1)

| | Stream | | | | | |
|---|---|---|---|---|---|---|
| | 1 | 3 | 5 | 7 | 9 | 11 |
| Flowrate, MMSCFD | 16.1 | 4.4 | 4.4 | 1.0 | 3.4 | 15.1 |
| Composition, vol % | | | | | | |
| Hydrogen | 20.1 | 41.1 | 41.1 | 100.0 | 23.9 | 14.8 |
| Methane | 20.4 | 40.6 | 40.6 | 0.0 | 52.5 | 21.7 |
| Ethylene | 8.4 | 8.1 | 8.1 | 0.0 | 10.5 | 9.0 |
| Ethane | 7.6 | 6.7 | 6.7 | 0.0 | 8.7 | 8.1 |
| Propylene | 28.5 | 1.7 | 1.7 | 0.0 | 2.1 | 30.4 |
| Propane | 15.0 | 1.8 | 1.8 | 0.0 | 2.3 | 16.0 |
| Pressure, psig | 100 | 95 | 205 | 200 | 5 | 2 |

Table 4 illustrates the use of PSA reject as the sweep gas in the combined adsorbent membrane-PSA system of FIG. 1. The use of the entire methane-rich PSA reject stream 9 as the sweep gas, rather than a portion of high purity hydrogen product stream 7, is preferred because the recovery of hydrogen is maximized. Hydrogen recovery using the PSA reject as sweep is 30.9%. A comparison of the pressures of membrane feed stream 1 and membrane nonpermeate stream 3 illustrates that significant hydrogen enrichment is achieved with minimum pressure drop, which is fundamentally different than the operation of a polymeric membrane in which hydrogen enrichment by permeation through the polymeric membrane is achieved with a much larger pressure drop. The high rejection of propane and propylene in the permeate from the adsorbent membrane is clearly illustrated by a comparison of the compositions of streams 1 and 3.

The present invention thus enables the improved operation of an adsorbent membrane which comprises a microporous adsorbent material supported by an essentially inert substrate. By using a sweep gas other than high purity product gas, product recovery is increased and membrane performance is enhanced by the increased permeation rates of the contaminants in the membrane feed. In the recovery of hydrogen from hydrogen-hydrocarbon mixtures, in particular when a PSA system is operated in series with the membrane, it has been found unexpectedly that the methane-containing reject stream from the PSA system is a more effective sweep gas than hydrogen product for increasing the permeation rate of the $C_2$ and especially $C_3$ hydrocarbons. This is desirable because hydrogen recovery is significantly higher when a portion of hydrogen product is not used for sweep, and further because the use of the preferred sweep gas reduces the membrane area required to process a given gas feed rate. Methane is a particularly effective and economical sweep gas for an adsorptive membrane system integrated with a steam-methane reformer, since a portion of the reformer methane feed can be used for sweep with the permeate/sweep effluent gas returned to the reformer as feed or fuel.

The essential characteristics of the present invention are described completely in the foregoing disclosure. One skilled in the art can understand the invention and make various modifications thereto without departing from the basic spirit thereof, and without departing from the scope and range of equivalents of the claims which follow.

We claim:

1. A method for the recovery of one or more primary components from a gaseous feed mixture comprising said primary components and one or more secondary components, wherein said secondary components are more strongly adsorbed on an adsorbent material than said primary components, said method comprising:
   (a) passing said feed mixture into a separator containing a composite semipermeable membrane comprising microporous adsorbent material supported by a porous substrate, said membrane having a feed side and a permeate side, and withdrawing from said separator a nonpermeate intermediate product stream enriched in said primary components, wherein portions of said secondary components are selectively adsorbed by said microporous adsorbent material and diffuse from the feed side to the permeate side of said membrane as an adsorbed fluid phase;
   (b) withdrawing from the permeate side of said membrane a permeate comprising said secondary components;
   (c) separating said nonpermeate intermediate product stream into a high-purity product stream comprising said primary components and a reject stream comprising an additional portion of said secondary components; and
   (d) passing at least a portion of said reject stream across the permeate side of said membrane as a sweep gas and withdrawing from said separator a sweep gas/permeate effluent stream, thereby increasing the recovery of said primary components and increasing the permeation rate of said secondary components through said membrane.

2. The method of claim 1 wherein said intermediate product stream is separated in step (c) by passing the stream into a pressure swing adsorption system wherein remaining secondary components are selectively adsorbed, and withdrawing therefrom said high purity product comprising the primary components and said reject stream comprising an additional portion of said secondary components.

3. The method of claim 2 wherein said primary components comprise at least hydrogen.

4. The method of claim 3 wherein said secondary components comprise hydrocarbons selected from the group consisting of methane, ethane, ethylene, propane, propylene, butane, isobutane, butylene, isobutylene, and mixtures thereof.

5. The method of claim 4 wherein the pressure of said feed stream is between 20 and 300 psig.

6. The method of claim 5 wherein the pressure of said intermediate product stream is between 15 and 295 psig.

7. The method of claim 4 wherein the pressure of said reject stream used as said sweep gas is between 2 and 50 psig.

8. The method of claim 4 which further comprises reforming a methane-containing feed stream in a steam-methane reformer to produce a synthesis gas comprising hydrogen, carbon oxides, water, and unreacted methane, and combining said synthesis gas with said intermediate product stream prior to said pressure swing adsorption system.

9. The method of claim 8 which further comprises utilizing at least a portion of said sweep gas/permeate effluent stream as fuel in said steam-methane reformer.

10. The method of claim 4 which further comprises passing at least a portion of said sweep gas/permeate effluent stream into a dephlegmator, withdrawing therefrom a hydrocarbon product stream containing $C_3$ and heavier hydrocarbons, also withdrawing therefrom an intermediate light hydrocarbon stream containing components lighter than $C_3$, and combining said intermediate light hydrocarbon stream with said intermediate product stream prior to said pressure swing adsorption system.

11. A method for the production of hydrogen from a methane-containing feed gas and a gas mixture containing hydrogen and hydrocarbons, wherein said method comprises:
   (a) passing said gas mixture into a separator containing a composite semipermeable membrane comprising microporous adsorbent material supported by a porous substrate, said membrane having a feed side and a permeate side, and withdrawing from said separator an intermediate product stream enriched in hydrogen, wherein portions of said hydrocarbons are selectively adsorbed by said microporous adsorbent material and diffuse from the feed side to the permeate side of said membrane as an adsorbed fluid phase;

(b) withdrawing from the permeate side of said membrane a permeate comprising said hydrocarbons;

(c) reforming a portion of said methane-containing feed gas in a steam-methane reformer to produce a synthesis gas comprising hydrogen, carbon oxides, water, and unreacted methane, and combining said synthesis gas with said intermediate product stream;

(d) passing the resulting combined stream of step (c) into a pressure swing adsorption system wherein hydrocarbons and carbon oxides are selectively adsorbed, and withdrawing therefrom a high purity hydrogen product and a reject stream comprising hydrocarbons and carbon oxides; and (e) passing the remaining portion of said methane-containing feed gas across the permeate side of said membrane as a sweep gas and withdrawing from said separator a sweep gas/permeate effluent stream, thereby increasing the recovery of hydrogen and increasing the permeation rate of hydrocarbons through said membrane.

12. The method of claim 11 which further comprises utilizing at least a portion of said sweep gas/permeate effluent stream as fuel in said steam-methane reformer.

13. The method of claim 11 which further comprises utilizing at least a portion of said sweep gas/permeate effluent stream as additional feed in said steam-methane reformer.

14. The method of claim 11 which further comprises utilizing at least a portion of said reject stream from said pressure swing absorption system as fuel in said steam-methane reformer.

* * * * *